Patented Oct. 25, 1949

2,485,592

UNITED STATES PATENT OFFICE 2,485,592

MOLDING COMPOSITIONS

Gerald A. Griess and Earl D. Morris, Midland, Mich., assignors to The Dow Chemical Company, Midland, Mich., a corporation of Delaware No Drawing. Application March 9, 1946, Serial No. 653,443

18 Claims. (Cl. 260—23)

This invention concerns new molding compositions comprising thermoplastic vinyl aromatic resins together with certain agents for increasing the rate of flow of the resin during molding. It also concerns the preparation of the molding compositions.

The term "vinyl aromatic resins" pertains to solid polymers and copolymers of vinyl aromatic compounds having the vinyl group attached to a carbon atom of the aromatic nucleus. Examples of the thermoplastic vinyl aromatic resins with which the invention is concerned are polystyrene, the solid polymers of ortho-chlorostyrene, meta-chlorostyrene, para-chlorostyrene, ortho-methylstyrene, meta-methylstyrene, para-methylstyrene, ortho-ethylstyrene, meta-ethylstyrene, para-ethylstyrene, or para-isopropylstyrene, and solid resinous copolymers of any of these monovinyl aromatic compounds with other readily polymerizable unsaturated organic compounds such as vinyl chloride, alpha-methyl-styrene, ethyl acrylate, or methyl methacrylate, etc. The invention pertains especially to molding compositions comprising polystyrene as the vinyl aromatic resin component.

Vinyl aromatic resins such as those just mentioned are known to possess desirable properties, e. g. transparency, clarity, luster, good strength characteristics, excellent dielectric properties and ability to be molded under pressure at elevated temperatures, which render them suitable for the manufacture of electric insulators, combs, brush handles and a variety of other molded products. Polystyrene, in particular, is used in large quantities for the production of such articles.

However, the vinyl aromatic resins, e. g. polystyrene, are often undesirably resistant to rapid flow during molding, and difficulties have been encountered in producing accurate moldings at the rapid rates required in commercial operations. Such difficulties have been particularly pronounced in instances in which irregular shaped articles were to be produced by the injection molding method. Although the rates of flow during molding may readily be increased by incorporating any of a variety of known plasticizing agents with the resin prior to molding, most plasticizers, when added in amount sufficient for the purpose, seriously impair one or more of the properties of the molded product. For instance, such addition of a usual plasticizer often results in a pronounced decrease in tensile strength, a lowering of the heat distortion temperature, or impairs the dielectric properties of the vinyl aromatic resin.

It is an object of this invention to provide certain flow agents which, when incorporated in small amount together with a vinyl aromatic resin, increase greatly the ease, uniformity and rate of flow of the resin during molding without seriously impairing the properties of the molded product. Another object is to provide molding compositions comprising a vinyl aromatic resin together with a minor amount of such flow agent, which compositions can be molded rapidly and with accuracy to produce articles having an appearance and mechanical and dielectric properties practically as good as those of similar articles molded from the vinyl aromatic resin alone. A further object is to provide such molding compositions which include, together with the vinyl aromatic resin and flow agent, a lubricant for facilitating rapid removal of the molded articles from molds in which they are formed and for reducing the possibility of the products becoming scratched, or otherwise marred at the surface, during such removal. Other objects will be apparent from the following description of the invention.

We have found that certain substantially non-volatile esters of aliphatic polyhydric alcohols, when incorporated with a vinyl aromatic resin in amount corresponding to between 0.05 and 4 per cent of the weight of the latter, have a pronounced effect in increasing the rate of flow of the resin under pressure at a heat-plastifying temperature, but that the ester, when used in such proportion, has only a slight effect on other properties of the resin such as its appearance, tensile strength, heat distortion temperature, or dielectric properties, etc. Accordingly, incorporation of such small proportion of the ester together with a vinyl aromatic resin facilitates the speed and accuracy with which the resin may be molded without impairing appreciably the value of the molded articles for most purposes. However, it is important that the ester be used within the range of proportions stated above. With increase in the proportion of ester above said range, the ester has an appreciable and increasing effect on the mechanical and dielectric properties of the molded articles, e. g. it reduces considerably the value of one or more mechanical characteristics such as the tensile strength or heat distortion temperature, or it causes an increase in the electric power factor.

The polyhydric alcohol esters suitable for use as the flow agents are esters of aliphatic monocarboxylic acids and are substantially non-volatile both at room temperature and under usual molding conditions, i. e. they have boiling points higher than 200° C. at 1 millimeter of mercury, absolute pressure. They may be saturated or unsaturated compounds, but when unsaturated are substantially free of conjugation. The esters are ones in which an average of at least 90 per cent of the hydroxyl radicals of the polyhydric alcohol are chemically combined with acid radicals as ester groups, i. e. esterification is nearly complete throughout the body of ester material.

Examples of polyhydric alcohol esters, or mixtures of esters, suitable for use as the flow agents are drying oils, semi-drying oils and non-drying oils of animal or vegetable origin such as linseed oil, soybean oil, perilla oil, fish oils, castor oil, cocoanut oil, safflower oil, palm oil, cottonseed oil, sunflower oil, hempseed oil, and corn oil. Synthetic oils or greases obtained by hydrogenating unsaturated animal or vegetable oils, e. g. hydrogenated cottonseed oil, or hydrogenated linseed oil, etc., are also suitable for use. Synthetic esters of polyhydric alcohols such as ethylene glycol, propylene glycol, butylene glycol, glycerine, mannitol, pentaerythritols, or sorbitol with aliphatic monocarboxylic acids, and mixtures of such esters with one another, or with a semi-drying or a non-drying animal or vegetable oil, may also be used. Examples of such synthetic esters are ethylene glycol distearate, ethylene glycol dilaurate, ethylene glycol dipalmitate, ethylene glycol dioleate, 1·3-butylene glycol dimyristate, glycerine trioleate, etc. In general, esters of the polyhydric alcohols with higher aliphatic monocarboxylic acids having 12 or more carbon atoms in the acid radical are preferred, but the ester may include radicals of lower acids. The requirements are that the ester or esters be substantially non-volatile and that they also be substantially free of conjugated olefinic linkages.

The polyhydric alcohol ester is most conveniently added to the polymerizable compound or compounds used in making the vinyl aromatic resin prior to polymerizing such compounds to form the resin. The polymerization may be carried out in any of the usual ways, e. g. in the presence or absence of a polymerization catalyst and en masse, in solution, or in aqueous emulsion, or aqueous suspension. It usually is accomplished en masse at polymerization temperatures in the order of from 50° to 180° C., although lower or higher temperatures may be used. The ester added as a flow agent has little, or no, effect on the rate or extent of polymerization. It does tend to render the polymer product of more uniform viscosity throughout the mass than when the polymerization is carried out in the absence of the ester under otherwise similar conditions. By adding the flow agent to the polymerizable material prior to forming the resin, the agent becomes uniformly incorporated throughout the mass of resin.

Instead of adding the flow agent prior to forming the resin, it may, if desired, be admixed directly with a preformed vinyl aromatic resin. This may be accomplished in any of several ways, e. g. by dissolving the flow agent and resin in a mutual solvent such as benzene, xylene, ethylbenzene, or ethylene chloride and thereafter removing the solvent by vaporization, or more conveniently by admixing the flow agent directly with the heat-plastified resin on heated compounding rolls.

The composition of a vinyl aromatic resin and from 0.05 to 4, preferably from 0.1 to 2.5, per cent of its weight of the flow agent is well adapted to use in compression or injection molding operations for the production of well-defined molded articles at a rapid rate.

In some instances, there is considerable frictional resistance against removal of vinyl aromatic resin articles from the molds in which they are formed. As a result, surface marring of the articles may occur to an objectionable extent in a commercial process involving molding and ejection of the articles at high rates of speed. This difficulty may be overcome by incorporating a lubricant together with the mixture of vinyl aromatic resin and flow agent. A variety of lubricants which may be employed for the purpose are known to the art. Examples of suitable lubricants are soaps such as the sodium, potassium, zinc, or other metal salts of higher fatty acids such as stearic, oleic and palmitic acids, and alkyl esters of higher fatty acids, e. g. ethyl stearate, propyl oleate, butyl stearate, ethyl palmitate, amyl stearate, methyl 12-hydroxy-stearate, etc. The alkyl esters just mentioned, particularly butyl stearate, are especially suitable for use as lubricants. The lubricant is preferably used in amount compatible with the molding composition. Usually, a lubricant is incorporated in the molding composition in amount corresponding to between 0.05 and 2, preferably between 0.1 and 1.5 per cent of the weight of the vinyl aromatic resin, but the lubricant may be used in somewhat smaller or larger proportions. A soap, if used in amount greater than that compatible with the other components of the molding composition, causes formation of molded articles which are translucent, opaque, or pearlescent. In some instances, articles of such appearance are desired. The lubricant may be added in ways hereinbefore mentioned for incorporating the flow agent with a vinyl aromatic resin. It is preferably added together with the flow agent.

Other materials such as dyes, pigments, plasticizers, or fillers may, if desired, also be incorporated together with the molding composition.

The molding composition is preferably produced in a granular form such as is conventionally used in molding operations. It is adapted for use in any of the conventional molding or extrusion operations and may be used with particular advantage in injection molding processes.

The following examples describe a number of ways in which the principle of the invention has been applied but are not to be construed as limiting the invention.

EXAMPLE 1

In each of a series of experiments, a polymerization mixture, having the composition indicated in the following table, was polymerized by heating the same in a closed container in accordance was the following schedule of time and temperature conditions: 3 days at 64° C.; 1 day at 70° C.; 1 day at 80° C.; 1 day at 90° C., 2 days at 100° C.; and 4 days at 185° C. The rate of flow at 135° C. in terms of seconds required for a sample of the material to flow one inch through a ⅛ inch orifice under an applied extrusion pressure of 1000 pounds per square inch was determined in accordance with procedure described in A. S. T. M. D569–44T. The time required for this amount of flow becomes less with increase in the rate of flow. A portion of each product containing a flow agent was injection molded to form test bars of ⅛ by ⅛ inch square cross section. These test bars were used to determine the tensile strength in pounds per square inch of initial cross section, the flexural strength expressed in the same units, the per cent of its original length by which each product could be elongated under tension before breakage occurred, and the impact strength of each product in inch-pounds of energy applied as a sharp blow to cause breakage of a test bar. Except for the shape and dimensions of the test bars and the weight of the hammer used in measuring impact strength, the procedures in determining the tensile strength and per cent elongation values were similar to those described in A. S. T. M. D638–44T and the procedure followed in measuring impact strength was similar to that described in A. S. T. M. D256–43T. The procedure in measuring flexural strength was similar to that given in A. S. T. M. D790–44T. Table I identifies each polymeric product by naming the ingredients of the polymerization mixture from which it was prepared and giving the parts by weight of each ingredient in the mixture. It also gives the properties determined for each product.

EXAMPLE 2

Styrene alone and mixtures of styrene and soybean oil were, in a series of experiments, polymerized in the presence of 0.04 per cent by weight of benzoyl peroxide. The procedure was similar to that described in Example 1, except that the polymerizations were carried out in accordance with the following schedule of time and temperature conditions: 18 hours at 60° C.; 6 hours at 20° C.; 6.5 hours at 65° C.; 47.5 hours at 75° C.; 35.5 hours at 86° C.; 26 hours at 99° C.; and 3 days at 180° C. The rates of flow of the polymerized products and also the tensile strength, impact strength, and per cent elongation values of test bars molded from the products were determined as in Example 1. Other molded test pieces were used to determine the heat distortion temperatures by a procedure of Heirholzer and Boyer, A. S. T. M. Bulletin No. 134 of May, 1945, and to determine, under the action of an alternating current having a frequency of $10^6$ cycles

*Table I*

| No. | Polymerization Mixture | | | Properties of Product | | | | |
|---|---|---|---|---|---|---|---|---|
| | Styrene, pts. | Soybean Oil, pt. | Benzoyl Peroxide, pts. | Flow Rate, seconds | Tensile Strength, lbs./sq. in. | Flexural Strength, lbs./sq. in. | Per Cent Elongation | Impact Strength, Inch, lbs. |
| 1 | 100 | 0 | 0 | 179 | not determined | | | 1.1 |
| 2 | 99.5 | 0.5 | 0 | 88 | 9,500 | 18,200 | 2.6 | 1.1 |
| 3 | 99.0 | 1.0 | 0 | 82 | 10,100 | 18,700 | 3.4 | 1.4 |
| 4 | 97.0 | 3.0 | 0 | 55 | 8,200 | 17,800 | 1.9 | 1.2 |
| 5 | 95.0 | 5.0 | 0 | 43 | 6,700 | 16,300 | 1.5 | 1.0 |
| 6 | 100 | 0 | 0.06 | 309 | not determined | | | 1.2 |
| 7 | 99.5 | 0.5 | 0.06 | 129 | 9,600 | 17,800 | 3.1 | 1.2 |
| 8 | 99.0 | 1.0 | 0.06 | 98 | 9,800 | 18,500 | 3.4 | 1.1 |
| 9 | 97.0 | 3.0 | 0.06 | 57 | 8,700 | 17,800 | 2.5 | 1.3 |
| 10 | 95.0 | 5.0 | 0.06 | 46 | 7,600 | 16,400 | 2.5 | 1.2 |

Although the mechanical properties, other than rate of flow, were not determined for the samples of polystyrene in the above runs 1 and 6, it is known by experience that they would be approximately the same as shown for the products of the respective runs 2 and 7. In runs 1–5 and also in runs 6–10 it will be noted that the incorporation of from 0.5 to 2 per cent of soybean oil together with polystyrene increased tremendously the rate of flow at a heat plastifying temperature, but that it did not seriously impair, and in some instances improved, the other properties of the molded test bars. However, as the proportion of soybean oil in the products was increased from 3 to 5 per cent, the tensile and flex strength values became unduly low. In general, the products are impaired to a serious extent by the use of more than 4 per cent of a polyhydric alcohol ester together with a vinyl aromatic resin, but lesser amounts of such ester may be used to improve the flow rates of the resins without impairing to any great extent the properties of articles molded therefrom.

per second, the dielectric constant and the per cent power factor of each product in accordance with procedures described in A. S. T. M. D150–44T. Table II states the parts by weight of styrene and soybean oil in each mixture subjected to polymerization and gives the properties of the polymerized products.

*Table II*

| Run No. | Polymerization Mixture | | Properties of Products | | | | | | |
|---|---|---|---|---|---|---|---|---|---|
| | Parts Styrene | Parts Soybean Oil | Flow Rate, Seconds | Tensile Strength, lbs./sq. in. | Impact Strength, Inch-lbs. | Per Cent Elongation | Heat Distortion Temp., °C. | Dielectric Constant | Per Cent Power Factor |
| 1 | 100 | 0 | 141 | 9,700 | 1.3 | 3.7 | 86 | 2.51 | 0.017 |
| 2 | 99.5 | 0.5 | 125 | 9,700 | 1.3 | 3.2 | 89.5 | 2.55 | 0.022 |
| 3 | 99.0 | 1.0 | 96 | 9,400 | 1.3 | 3.1 | 84 | 2.52 | 0.17 |
| 4 | 98.5 | 1.5 | 68 | 8,900 | 1.2 | 2.9 | 86 | 2.52 | 0.21 |
| 5 | 98.0 | 2.0 | 69 | 8,400 | 1.1 | 2.6 | 83 | 2.51 | 0.031 |

EXAMPLE 3

A series of experiments similar to those of Examples 1 and 2 were carried out, except that the styrene used as a starting material contained 15 parts per million of tertiary butyl catechol, each polymerization mixture initially contained 0.04 per cent by weight of benzoyl peroxide as a polymerization catalyst and approximately 1 per cent of n-butyl stearate as a lubricant for facilitating removal of the polymeric products from molds used in shaping them, and that each polymerization reaction was carried out in accordance with the following schedule of time and temperature conditions: 2 days at 65° C.; 1 day at 98° C.; 3 days at 185° C. Portions of each polymeric product were tested to determine the proportion of volatile material therein and also to determine a viscosity characteristic of the polymer. The procedure in determining the proportion of volatile material was to weigh a portion of the polymeric product, then heat it under vacuum at 153° C. and at 1 millimeter absolute pressure for 3 hours, and cool and re-weigh. The loss in weight represents volatile ingredients. The viscosity characteristic was determined by dissolving a portion of polymeric product in toluene to form a solution containing 10 per cent by weight of said product and determining the absolute viscosity in centipoises at 25° C. of the solution. Other properties of the polymeric products were determined as in the preceding examples. Table III identifies each polymeric product by giving the relative proportions, in parts by weight, of styrene and soybean oil used in preparing the same. The table gives the per cent by weight of volatile material in each polymeric product and the absolute viscosity of a 10 per cent solution of the product in toluene. Other properties are expressed as in the preceding examples.

of flow under pressure at 135° C. and other properties of the polymerized products were determined as in the preceding examples and are presented in the following table. The table identifies each polymeric product by naming the ester-containing material therein and giving the parts by weight of styrene and the ester-containing material used in making the product. The table also indicates the general class of materials to which the ester-containing material belongs, i. e. whether it is a semi-drying oil, or a non-drying oil, etc.

Table IV

| Run No. | Polymerization Mixture Comprised | | | | Properties of Products | | | |
|---|---|---|---|---|---|---|---|---|
| | Styrene, pts. | Ester-Containing Material | | | Flow Rate, Seconds | Tensile Strength, lbs./sq. in. | Impact Strength, Inch-lbs. | Per Cent Elongation |
| | | Name | Class | Pts. | | | | |
| 1 | 100 | | | 0 | 141 | 9,700 | 1.3 | 3.7 |
| 2 | 99.5 | Linseed Oil | Drying | 0.5 | 120 | 9,700 | 1.2 | 3.4 |
| 3 | 99.0 | do | do | 1.0 | 108 | 9,200 | 1.4 | 3.0 |
| 4 | 100 | | | 0 | 215 | not measured | | |
| 5 | 99.5 | Perilla Oil | Drying | 0.5 | 102 | 9,100 | 1.2 | 3.5 |
| 6 | 99.0 | do | do | 1.0 | 85 | 8,900 | 1.2 | 3.1 |
| 7 | 97.0 | do | do | 3.0 | 49 | 7,500 | 1.0 | 2.5 |
| 8 | 95.0 | do | do | 5.0 | 40 | 5,300 | 0.7 | 2.0 |
| 9 | 100 | | | 0 | 191 | not measured | | |
| 10 | 99.5 | Fish Oil | Drying | 0.5 | 105 | 9,500 | 1.3 | 3.5 |
| 11 | 99.0 | do | do | 1.0 | 83 | 9,200 | 1.1 | 3.3 |
| 12 | 97.0 | do | do | 3.0 | 49 | 7,700 | 1.0 | 2.3 |
| 13 | 95.0 | do | do | 5.0 | 39 | 4,900 | 0.6 | 1.0 |
| 14 | 100 | | | 0 | 127 | 9,600 | 0.9 | 2.8 |
| 15 | 99 | Cocoanut Oil | Non-drying | 1.0 | 88 | 8,800 | 1.1 | 2.3 |
| 16 | 99 | Palm Oil | do | 1.0 | 48 | 8,300 | 0.9 | 2.1 |
| 17 | 99 | Cottonseed Oil | Semi-drying | 1.0 | 49.3 | 9,200 | 1.1 | 2.5 |
| 18 | 99 | Corn Oil | do | 1.0 | 83 | 8,900 | 0.9 | 2.3 |

In the following claims the term "polymer" is employed generically and encompasses homopolymers and copolymers of the compounds named.

Other modes of applying the principle of the invention may be employed instead of those explained, change being made as regards the method or compositions herein disclosed, provided the steps or ingredients stated by any of the following claims or the equivalent of such steps or ingredients be employed.

We therefore particularly point out and distinctly claim as our invention:

1. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, a substantially non-volatile aliphatic monocarboxylic acid ester of a polyhydric alcohol, which ester contains no conjugated olefinic linkages in the molecule, said ester being present in amount corresponding to between 0.05 and 4 per cent of the weight of the vinyl aromatic resin.

2. A molding composition comprising, as its

Table III

| Run No. | Products Comprise | | Properties of Products | | | | | |
|---|---|---|---|---|---|---|---|---|
| | Parts Styrene | Parts Soybean Oil | Volatiles, Per Cent | Viscosity, cps. | Flow Rate, Seconds | Tensile Strength, lbs./sq. in. | Impact Strength, Inch-lbs. | Per Cent Elongation |
| 1 | 100 | 0 | 1.19 | 60.8 | 96 | 8,000 | 0.9 | 2.1 |
| 2 | 99.0 | 1.0 | 1.20 | 63.3 | 81 | 8,500 | 1.0 | 2.5 |
| 3 | 98.5 | 1.5 | 1.02 | 59.8 | 72 | 8,300 | 1.1 | 2.3 |

EXAMPLE 4

In several series of tests, a variety of materials rich in non-drying esters of the polyhydric alcohols were admixed with separate portions of styrene and the latter was polymerized. Together with the samples of styrene and a given drying oil there was polymerized a sample of styrene alone, the conditions of time and temperature in carrying out these polymerizations being the same. However, the polymerization schedules were, in some instances, varied in going from the use of one ester to the use of another. The rates principal component, a solid thermoplastic vinyl aromatic resin which is a polymer of a compound of the class consisting of monovinyl aromatic hydrocarbons of the benzene series and nuclear chorinated monovinyl aromatic hydrocarbons of the benzene series, uniformly incorporated together with said resin, a substantially non-volatile aliphatic monocarboxylic acid ester of a polyhydric alcohol, which ester contains no conjugated olefinic linkages in the molecule, said ester being present in amount corresponding to between 0.1 and 2.5 per cent of the weight of the vinyl aromatic resin.

3. A molding composition comprising a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series and, uniformly incorporated together with said resin, a molding lubricant and a substantially non-volatile aliphatic monocarboxylic acid ester of an aliphatic polyhydric alcohol, which ester contains no conjugated olefinic linkages in the molecule, said ester being present in amount corresponding to between 0.1 and 2.5 per cent of the weight of the vinyl aromatic resin.

4. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, a substantially non-volatile semi-drying oil which is free of conjugated olefinic linkages, said oil being present in amount corresponding to between 0.05 and 4 per cent of the weight of the vinyl aromatic resin.

5. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, a substantially non-volatile semi-drying oil which is free of conjugated olefinic linkages, said oil being present in amount corresponding to between 0.1 and 2.5 per cent of the weight of the vinyl aromatic resin.

6. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, incorporated together therewith, a mold lubricant in amount corresponding to between 0.05 and 2 per cent of the weight of the vinyl aromatic resin, and a substantially non-volatile semi-drying oil free of conjugated olefinic linkages, which semi-drying oil is present in amount corresponding to between 0.1 and 2.5 per cent of the weight of the vinyl aromatic resin.

7. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, a substantially non-volatile non-drying oil, which is an ester containing no conjugated olefinic linkages in the molecule, which oil is present in amount corresponding to between 0.05 and 4 per cent of the weight of the vinyl aromatic resin.

8. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, a substantially non-volatile non-drying oil, which is an ester containing no conjugated olefinic linkages in the molecule, said oil being present in amount corresponding to between 0.1 and 2.5 per cent of the weight of the vinyl aromatic resin.

9. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together therewith a mold lubricant in amount corresponding to between 0.05 and 2 per cent of the weight of the vinyl aromatic resin, and a substantially non-volatile non-drying oil, which is an ester containing no conjugated olefinic linkages in the molecule, said oil being present in amount corresponding to between 0.1 and 2.5 per cent of the weight of the vinyl aromatic resin.

10. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, soybean oil in amount corresponding to between 0.05 and 4 per cent of the weight of the vinyl aromatic resin.

11. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, uniformly incorporated together with said resin, soybean oil in amount corresponding to between 0.1 and 2.5 per cent of the weight of the vinyl aromatic resin.

12. A molding composition comprising, as its principal component, a solid thermoplastic vinyl aromatic resin which is a polymer of a compound of the class consisting of monovinyl aromatic hydrocarbons of the benzene series and nuclear chlorinated monovinyl aromatic hydrocarbons of the benzene series, together with said resin, a mold lubricant in amount corresponding to between 0.05 and 2 per cent of the weight of the resin, and soybean oil in amount corresponding to between 0.1 and 2.5 per cent of the weight of the resin.

13. A molding composition comprising solid polystyrene having incorporated together therewith a substantially non-volatile aliphatic monocarboxylic acid ester of an aliphatic polyhydric achohol, which ester contains no conjugated olefinic linkages in the molecule and which ester is present in amount corresponding to between 0.05 and 4 per cent of the weight of the polystyrene.

14. A molding composition comprising solid polystyrne as its principal component and, incorporated together with the polystyrene, a substantially non-volatile aliphatic monocarboxylic acid ester of an aliphatic polyhydric alcohol, which ester contains no conjugated olefinic linkages in the molecule and which ester is present in amount corresponding to between 0.1 and 2.5 per cent of the weight of the polystyrene.

15. A molding composition comprising solid solid polystyrene as its principal component and, uniformly incorporated together with the polystyrene, a substantially non-volatile semi-drying oil in amount corresponding to between 0.05 and 4 per cent of the weight of the polystyrene.

16. A molding composition comprising polystyrene as its principal component and, uniformly incorporated together with the polystyrene, a substantially non-volatile non-drying oil, which is an ester containing no conjugated olefinic linkages in the molecule, which oil is present in amount corresponding to between 0.05 and 4 per cent of the weight of the polystyrene.

17. A molding composition polystyrene as its principal component and, uniformly incorporated together with the polystyrene, soybean oil in amount corresponding to between 0.1 and 2.5 per cent of the weight of the polystyrene.

18. A molding composition comprising a substantially uniform mixture of polystyrene, butyl stearate, and soybean oil, the butyl stearate being present in amount corresponding to between 0.05 and 2 per cent of the weight of the polystyrene and the soybean oil being present in amount corresponding to between 0.1 and 2.5 per cent of the weight of the polystyrene.

GERALD A. GRIESS.
EARL D. MORRIS.

REFERENCES CITED

The following references are of record in the file of this patent:

UNITED STATES PATENTS

| Number | Name | Date |
| --- | --- | --- |
| 1,811,078 | Dykstra | June 23, 1931 |
| 2,275,584 | Catlow et al, | Mar. 10, 1942 |